J. P. MANTON.

WINDLASSES.

No. 6,774. Reissued Nov. 30, 1875.

Attest:
Geo. H. Remington.
Frank L. Manton.

Inventor:
Joseph P. Manton

UNITED STATES PATENT OFFICE.

JOSEPH P. MANTON, OF PROVIDENCE, RHODE ISLAND.

IMPROVEMENT IN WINDLASSES.

Specification forming part of Letters Patent No. 169,182, dated October 26, 1875; reissue No. 6,774, dated November 30, 1875; application filed November 19, 1875.

*To all whom it may concern:*

Be it known that I, JOSEPH P. MANTON, of the city of Providence, State of Rhode Island, have invented new and useful Improvements in Windlasses; and I do hereby declare that the following is a full, clear, and exact description of the same, reference being had to the accompanying drawings, forming part of this specification.

Figure 1:
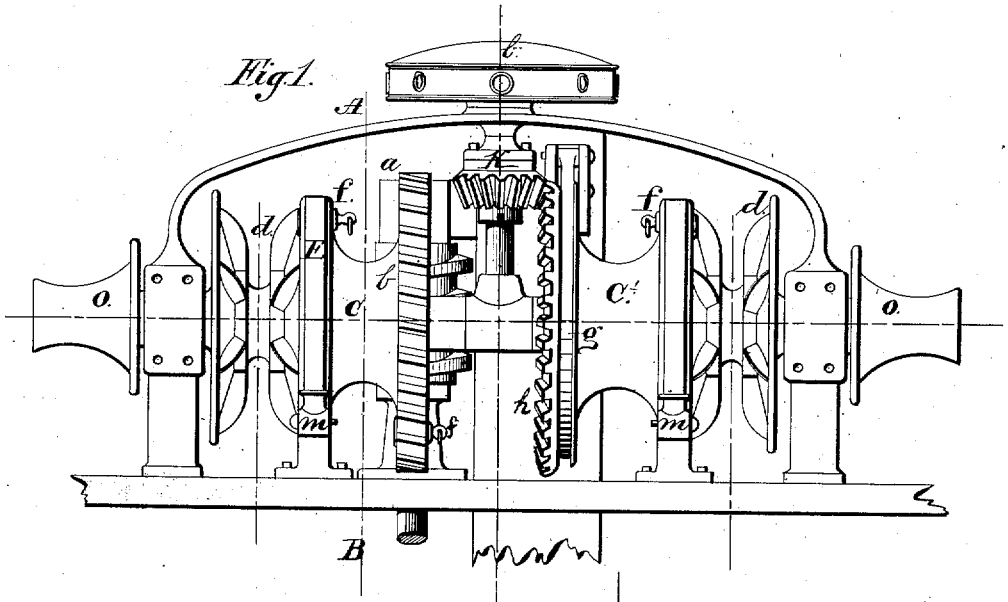
Figure 2:
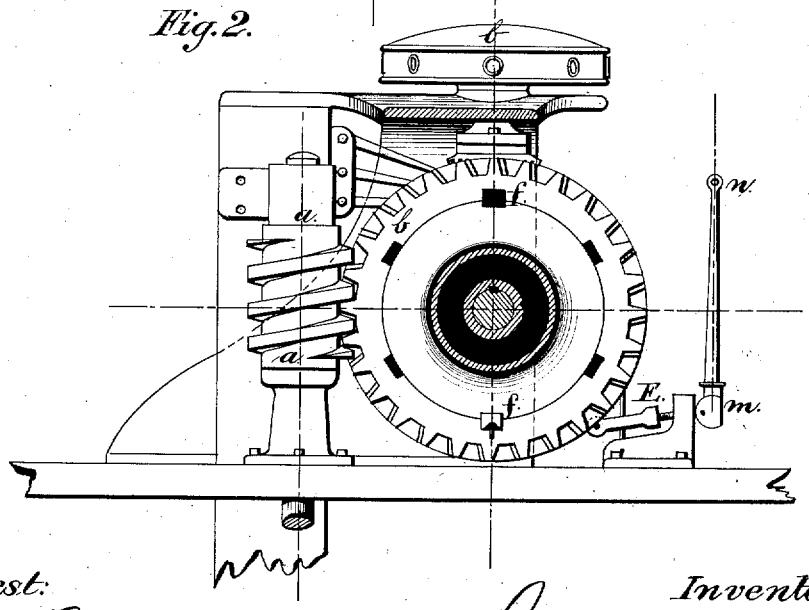

Figure 1 in the drawings is an elevation of my improved windlass, showing the relation of the different parts. Fig. 2 is a cross-section, and shows the application of the worm and worm-gear, and the locking arrangement, by which the same may be locked to the barrel.

Similar letters of reference indicate corresponding parts.

The object of this invention is to arrange a windlass so that the same may be driven by the capstan-bars on the deck of a vessel, or by the usual hand-spikes, and also by a worm-gear, which may be operated either by hand or steam power, as an auxiliary appliance, so arranged that the worm-gear may be readily connected or disconnected, and that the power may be applied to either the barrel or wild-cat at pleasure.

The nature of the invention consists in combining with a windlass a worm and worm-gear, connected and arranged as herein described.

In the drawings, *a* is a worm geared into and driving the worm-gear *b*. This worm-gear is loose on the barrel C, but can be connected with the same by inserting the key-block *f*, when, instead of moving free on the barrel C, the worm-gear and barrel will move together. The worm-gear may also form a separate disk, mounted loose on the main shaft, so as to revolve freely on the same, and be locked to the barrel C by the key-block *f*, as shown. The barrels C and C′ are keyed to the main shaft, and revolve with the same. The wild-cat or chain-wheel *d* is loose on the shaft, but can be locked to the barrel by the key-block *f*. Connected to the wild-cat, or made in one piece with the same, is the friction wheel or brake, surrounded by the friction-strap E. *g* is a ratchet-wheel, placed on the barrel C′ opposite to the one on which the worm-gear is secured. Into this ratchet-wheel properly-arranged pawls enter, so that the shaft and barrels C and C′, secured to the same, as also the wild-cat, when secured to the barrel as shown, will be held firmly in any position desired, and so hold the chains or cable, and prevent paying out of the same. Connected also to the same barrel C′ is the bevel-gear *h*, and geared into this the beveled pinion *k*, which is rotated by the capstan-head *l*, in the usual manner, and is so arranged that the pinion-gear *k* will revolve freely when the power is applied to the screw or worm gear, while, when the power is applied to the capstan-head, the pawls engage and give motion to the windlass by means of the pinion *k* and gear *h*.

When power is applied to the worm or screw *a*, the same is transmitted to the worm-gear *b* and to the windlass; but the power is thus multiplied many fold, and in a much greater ratio than can be produced by any other kind of gearing having as few parts, as little friction, and as great strength of the several parts, which are simple in construction, not liable to derangement, and take up little room.

When the worm-gear is compared with the bevel-gear (both shown in the drawings in their relative dimensions with their relative efficiency) it will be apparent that, while the worm-gear multiplies the power nearly thirty times, the bevel-gear multiplies the power only about three times. The worm-gear is, therefore, ten times as efficient as the bevel-gear.

Such capacity to exert, when desired, an immense power with a windlass is of the greatest importance to a ship, as it frequently happens that all hands are required in other parts of a vessel, and only one man can be spared to loosen or hoist the anchor, which would not be possible with the ordinary gear. It also happens that a ship in harbor with only one or two men on board is compelled to use the windlass; or a ship may be short of hands. In all such cases an arrangement by which the exertion of one man is equal to ten on the old windlass will frequently save a vessel, which otherwise would be doomed to destruction.

Having thus described my invention, I claim as new and desire to secure by Letters Patent—

1. The combination of the worm *a* and worm-gear *b* with the windlass, consisting of the barrel C, the wild-cat *d*, and brake E, and the bevel-gear *h* and pinion *k*, substantially as and for the purpose specified.

2. The combination, with a windlass operated by means substantially as described, of the worm *a* and worm-gear *b*, as an auxiliary appliance, substantially as and for the purpose herein set forth.

JOSEPH P. MANTON.

Witnesses:
JOSEPH A. MILLER,
C. E. LAPHAM.